United States Patent
Johnston

(10) Patent No.: US 6,173,941 B1
(45) Date of Patent: Jan. 16, 2001

(54) VEHICLE MOBILE SERVICE TRAILER

(76) Inventor: Paul Johnston, 1710 Rock Creek Dairy Rd., Whitsett, NC (US) 27377

(*) Notice: Under 35 U.S.C. 154(b), the term of this patent shall be extended for 0 days.

(21) Appl. No.: 09/571,510

(22) Filed: May 15, 2000

Related U.S. Application Data

(63) Continuation-in-part of application No. 09/291,939, filed on Apr. 15, 1999.

(51) Int. Cl.$^7$ ........................................ B66F 7/12
(52) U.S. Cl. .................. 254/89 H; 254/88; 254/420; 254/90
(58) Field of Search ................... 254/89 H, 88, 254/90, 420, 216, 221; 187/216, 221

(56) References Cited

U.S. PATENT DOCUMENTS

| | | |
|---|---|---|
| 3,931,895 | 1/1976 | Grimaldo . |
| 4,031,982 | 6/1977 | Lindfors . |
| 4,238,114 | 12/1980 | Migliorati . |
| 4,350,222 | 9/1982 | Lutteke et al. . |
| 4,394,877 | 7/1983 | Whyte . |
| 4,445,665 | 5/1984 | Cray . |
| 4,724,875 | 2/1988 | Baldwin et al. . |
| 4,772,038 | 9/1988 | MacDonald . |
| 5,904,339 | * 5/1999 | Flinn ........................ 254/88 |
| 5,954,160 | * 9/1999 | Wells, Sr. et al. ............ 254/89 H |
| 6,059,263 | * 8/2000 | Otema et al. ................ 254/89 H |
| 6,102,370 | * 8/2000 | Johnston .................... 254/89 H |

FOREIGN PATENT DOCUMENTS

| | | |
|---|---|---|
| 385451 | 3/1965 | (CH) . |
| 458505 | 3/1975 | (SU) . |

* cited by examiner

Primary Examiner—James G. Smith
Assistant Examiner—Lee Wilson
(74) Attorney, Agent, or Firm—Richard C. Litman

(57) ABSTRACT

A mobile vehicle service trailer provides a portable maintenance facility for motor vehicles (passenger cars, pickup trucks and sport utility vehicles, etc.) without need to transport the vehicle to a maintenance facility at a fixed location. The present trailer has rearwardly disposed wheels and laterally extendible ramps, enabling the trailer to be positioned laterally at the front or rear of the vehicle needing service and the vehicle to be positioned laterally across the trailer. This configuration provides for ease of loading and unloading the vehicle to and from the trailer in cramped parking situations, such as parking lots and garages, etc. The rear wheels of the trailer are pivotally mounted, allowing the trailer body to be lowered to the underlying surface for placement of a vehicle thereon. A specially formed trailer hitch may be provided for the towing vehicle, allowing the hitch ball to be lowered to the underlying surface to lower the trailer tongue without disconnecting the trailer from the towing vehicle. Corner jacks are provided for raising and lowering the trailer body as desired. A forward and a rearward hydraulically powered lift hoist are provided on the trailer body, for raising the vehicle for access to the underside thereof for maintenance operations (oil changes, etc.). The present trailer also includes a hydraulic power supply for operating the corner jacks, vehicle hoists, and for raising and lowering the ramps as desired.

20 Claims, 5 Drawing Sheets

VEHICLE MOBILE SERVICE TRAILER

REFERENCE TO RELATED PATENT APPLICATION

This application is a continuation in part of U.S. patent application Ser. No. 09/291,939, filed on Apr. 15, 1999.

BACKGROUND OF THE INVENTION

1. Field of the Invention

The present invention relates generally to wheeled trailers for towing behind powered vehicles, and more specifically to a trailer adapted for servicing other motor vehicles (automobiles, light pickup trucks and the like, etc.) at various mobile locations. The present trailer includes rearwardly disposed and vertically adjustable wheels and laterally disposed ramps and lifting means providing for the loading of a motor vehicle onto the trailer for service, and lifting the vehicle for access to and service beneath the vehicle.

2. Description of the Related Art

Motor vehicles are conventionally driven or transported to a central location for mechanical and other service, with the central location providing a base of operations for mechanics and also providing tools, equipment, electrical, hydraulic, and pneumatic power, etc. generally accepted as necessary for such operations.

While such operations work well if the vehicle can be delivered to such a shop, oftentimes it can be difficult to perform such a delivery. The obvious situation preventing ease of delivery is the need for emergency repairs before the vehicle can be driven, as when a fuel pump or ignition system fails, etc. Even when the vehicle may be drivable, it may be extremely difficult for the owner or operator of the vehicle to arrange to deliver the vehicle to a specialized shop for certain repairs, due to shop hours, work hours of the owner, etc.

Also, many companies and commercial concerns operate at least a small fleet of motor vehicles, and particularly with smaller concerns, may not have their own dedicated vehicle shop or maintenance facility. In such a situation, the company must arrange for relatively frequent delivery and pickup of their vehicles to a maintenance facility for even the most routine of tasks (oil changes, tire maintenance and replacement, etc.).

Accordingly, some mechanics have recognized a need for some means of taking the maintenance facility to the location of the vehicle requiring maintenance or repair, rather than the other way around. Some mechanics have formed small businesses operating from a light truck, van, or other suitable vehicle, where the mechanic drives the maintenance vehicle to the location of the motor vehicle requiring maintenance or repair, and performs the maintenance or repair at that location, rather than requiring that the vehicle be driven or transported to a maintenance location.

While such operations have worked out reasonably well in certain limited types of maintenance, the maintenance which may be performed using such a mobile service facility is quite limited. For example, access beneath the vehicle for removal and replacement of an oil filter, etc. may be impossible using such mobile equipment. This greatly limits the type of maintenance which can be performed at the location of the motor vehicle, using such a conventional mobile maintenance facility. Moreover, oftentimes the vehicle requiring maintenance is in a severely limited location, such as an underground parking area where the operator has parked for the work day. It may be quite difficult, if not impossible, to access the vehicle for maintenance in such cramped quarters.

Accordingly, a need will be seen for a mobile service trailer for performing maintenance work upon an automobile or comparable motor vehicle. The present mobile service trailer is of conventional size for convenient towing, maneuvering, and storage, but includes lateral ramps and a pair of opposed chain drive type lifts for positioning a vehicle laterally across the trailer and lifting the vehicle for maintenance beneath the vehicle. The present trailer is an improvement over other such devices, in that the two lifts are positioned toward the forward and rearward ends of the trailer, enabling the trailer to be positioned in a drive through lane laterally across the front or rear of a vehicle, and the vehicle loaded laterally across the trailer by means of lateral ramps. This configuration saves considerable space and requires far less maneuvering in tight quarters.

A discussion of the related art of which the present inventor is aware, and its differences and distinctions from the present invention, is provided below.

U.S. Pat. No. 3,931,895 issued on Jan. 13, 1976 to Samuel Grimaldo, titled "Collapsible Trailer Hoist," describes a mobile trailer adapted for automobile maintenance. The Grimaldo trailer includes two laterally spaced, longitudinally oriented lift ramps, with further ramps extendible from the rear of the trailer for loading and unloading the vehicle. Hydraulic means are provided for lifting and lowering the lift ramps, and any vehicle positioned thereon. The Grimaldo trailer, with its continuous vehicle lift ramps and scissor type lift mechanism, has considerable more mechanism beneath the vehicle around which a mechanic must work in comparison to the present trailer invention, and moreover the generally medially positioned trailer wheels preclude any means for loading and unloading the vehicle from the side, as provided by the present service trailer invention.

U.S. Pat. No. 4,031,982 issued on Jun. 28, 1977 to Olov H. Lindfors, titled "Device For Mounting Chassis Details Onto An Automobile Body," describes a mobile apparatus for guiding along a vehicle assembly line in an assembly plant. The motor vehicle is raised to a stationary position over the center of the apparatus, with a vertical lift beneath the vehicle providing for lifting an engine assembly or the like into position in the vehicle for installation. No means for towing the Lindfors apparatus, nor for rolling a completed vehicle thereon for maintenance, is disclosed.

U.S. Pat. No. 4,238,114 issued on Dec. 9, 1980 to Pier I. Migliorati, titled "Rocking Platform For The Positioning Of Vehicles Above Ground Level," describes a platform having a dihedral base configuration, upon which a vehicle may be driven or towed. Initially, the vehicle climbs a pair of ramps at one end of the device, and upon reaching the combined center of mass of the vehicle and platform, rocks over to a level position upon the forward portion of the platform. While Migliorati provides wheels for his platform, they are not configured for use as road wheels or for transporting the device over relatively long distances. Rather, the wheels of the Migliorati device are only intended for pushing or pulling the platform around the area of a maintenance shop or the like. In any event, Migliorati does not provide any means for lowering the upper portion of the platform to a level adjacent the underlying surface, nor for positioning a vehicle laterally across the device, as provided by the present invention.

U.S. Pat. No. 4,350,222 issued on Sep. 21, 1982 to Martin T. Lutteke et al., titled "Variable Tread Vehicle," describes a frame for a mobile agricultural vehicle in which the tread (i.e., lateral spacing between wheels) is variable to accommodate different crop row spacing. The Lutteke et al. vehicle is more closely related to the present inventor's parent application in which laterally adjustable wheels were utilized for longitudinal loading of a vehicle upon the trailer, than to the present invention which utilizes lateral loading and in which the wheels do not move laterally relative to the trailer structure.

U.S. Pat. No. 4,394,877 issued on Jul. 26, 1983 to Lance Whyte, titled "Waste Fluid Receptacle," describes a device which may be extended from beneath a service vehicle to beneath another vehicle undergoing maintenance, to collect fluids (used oil, etc.) draining therefrom. The Whyte device provides for only limited maintenance operations and does nothing to lift the vehicle into the air for access to the underside, as provided by the present vehicle mobile service trailer invention. Moreover, the Whyte device is not a trailer, as is the present invention, but rather retracts and is carried beneath the maintenance vehicle.

U.S. Pat. No. 4,445,665 issued on May 1, 1984 to Donald L. Cray, titled "Vehicle Servicing Lift," describes a mobile vehicle service trailer having a pair of elongate longitudinally oriented ramps. The generally centrally disposed wheels of the device include hydraulic means for lowering the trailer frame to the underlying surface, but their location precludes the lateral orientation of the vehicle ramps and vehicle positioned thereon. In contrast, the present service trailer has wheels disposed at nearly the rear extremity of the trailer, thus keeping the sides of the trailer clear in order to provide lateral loading of a vehicle thereon. The result is a much more compact service trailer which may be positioned across the front of a vehicle requiring maintenance, and the vehicle driven or pulled straight across the trailer. This arrangement provides for ease of operation in tightly congested areas, such as parking garages and the like, as well as simplifying the trailer structure.

U.S. Pat. No. 4,724,875 issued on Feb. 16, 1988 to Wendell Baldwin et al., titled "Trailer-Mounted Portable Oil Change And Lubricating System For Vehicles," describes a device having limited vertical lift capability for a vehicle thereon. Baldwin et al. provide a "creeper" type dolly which rides on tracks positioned between the two wheel ramps or tracks for the vehicle, and indicate that a mechanic may lie or recline upon the dolly in order to perform work beneath the vehicle. In contrast, the two opposed chain hoist type lifts of the present service trailer, provide sufficient lifting height for a mechanic to stand beneath a vehicle supported by the lifts. Also, it is noted that the Baldwin device loads the vehicle longitudinally onto the trailer, with the generally centrally disposed wheels of the Baldwin trailer precluding any lateral loading or unloading of a vehicle thereon, as opposed to the lateral loading of the present service trailer.

U.S. Pat. No. 4,772,038 issued on Sep. 20, 1988 to Nelson MacDonald, titled "Expandable Trailer," describes a utility trailer having laterally expandable and retractable side frame members with laterally spaced wheels extending therefrom. The trailer may be narrowed for towing behind a small off road utility vehicle, or may be widened for towing behind a conventional motor vehicle with the off road vehicle being carried thereon. This trailer is more closely related to the trailer of the Lutteke '222 U.S. Patent and to the present inventor's parent application, each of which have laterally adjustable wheels, than to the present vehicle mobile service trailer.

Swiss Patent Publication No. 385,451 published on Mar. 15, 1965 to Pierre Knittel illustrates a stand having a pair of arcuate segments resting upon rollers therein, with each segment having a length of wheel track thereon. A vehicle is driven or rolled upon the two tracks by means of a pair of ramps, and the device is leveled once the vehicle is centered. While the device has rollers, these provide only for movement about a shop floor or the like, rather than being suitable for towing the device on the road. The device of the Swiss Patent Publication thus relates more closely to the device of the '114 U.S. Patent to Migliorati, than to the present vehicle mobile service trailer invention.

Finally, Soviet Patent Publication No. 458,505 published on Mar. 12, 1975 illustrates a mobile automobile hoist or lift. A relatively small trailer has a rearward portion with lift arms foldably extendible therefrom, onto which an automobile may be driven. The automobile is suspended above the underlying surface behind the trailer, when the lift arms are raised. The Soviet device does not provide for the automobile to be positioned across the center of the trailer and does not provide for symmetrical lifting of the vehicle from each side thereof, as in the present vehicle mobile service trailer invention.

None of the above inventions and patents, taken either singly or in combination, is seen to describe the instant invention as claimed.

SUMMARY OF THE INVENTION

The present invention comprises a vehicle mobile service trailer for transporting to the location of a motor vehicle requiring service and for elevating the vehicle on the trailer for service beneath the vehicle. The present mobile service trailer includes a pair of vertically adjustable rear wheels and a vertically adjustable tongue extending from the towing vehicle, enabling the trailer frame to be lowered immediately adjacent the underlying surface by four hydraulically operated corner jacks. Ramps are extended from each side of the trailer, and the vehicle requiring service is placed across the trailer by means of the ramps. A forward and a rearward hoist on the trailer are then used to raise the vehicle as required for access to the underside of the vehicle. When service is completed on the vehicle, it is removed from the trailer, the ramps are folded, the trailer is raised by means of the corner jacks, and the wheels and tongue are locked in their normal towing positions for towing the trailer away.

Accordingly, it is a principal object of the invention to provide an improved vehicle mobile service trailer providing for the lateral loading or placement of a motor vehicle or the like thereacross, and for lifting the vehicle, for servicing of the vehicle and access to the underside of the vehicle as required.

It is another object of the invention to provide an improved vehicle mobile service trailer including a forwardly and a rearwardly disposed hydraulically actuated hoist for lifting the vehicle above the surface of the trailer as required.

It is a further object of the invention to provide an improved vehicle mobile service trailer having rearwardly disposed wheels and a forwardly disposed tongue, which wheels and tongue may be raised relative to the trailer for lowering the trailer to rest upon the underlying surface.

An additional object of the invention is to provide an improved vehicle mobile service trailer including four hydraulically actuated corner jacks, for lowering and raising the trailer as required.

Still another object of the invention is to provide an improved vehicle mobile service trailer including laterally disposed folding ramps for loading and unloading the motor vehicle from the trailer as required.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a vehicle mobile service trailer, which may be towed to the location of a motor vehicle requiring service for servicing the vehicle at that location, rather than requiring the vehicle to be transported to a fixed maintenance site. The present trailer proves most valuable in the repair of disabled vehicles which cannot be driven, for maintenance of a large number of fleet vehicles gathered at a single location, and in other situations where it is difficult to drive or otherwise transport a vehicle requiring maintenance to a maintenance facility.

Figure 1:
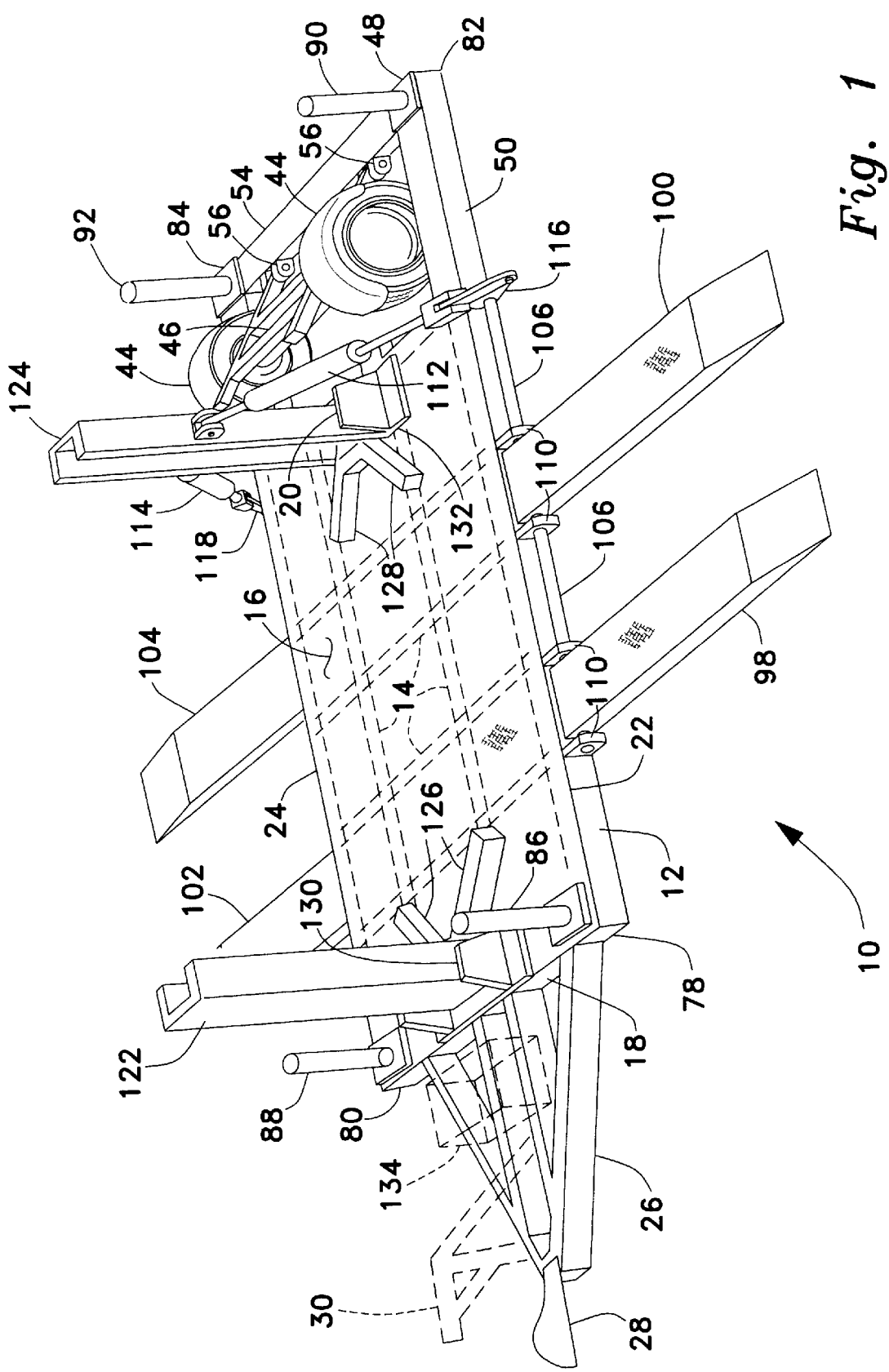
FIG. 1 is a perspective view of the present vehicle mobile service trailer, showing its general features and structure.

FIG. 1 provides an overall perspective view of the present trailer, designated by the reference character 10 throughout the drawings. The trailer 10 generally comprises a low, flat platform area 12 formed of a subframe 14 (shown in broken lines in FIG. 1) and a continuous overlay or floor 16 secured to the subframe 14. The platform 12 may be of a rectangular configuration as shown in the drawings, and includes a forward end 18, an opposite rearward end 20, a left side 22, and an opposite right side 24. The platform 12 is completely open along its lateral edges 22 and 24, with no fences, walls, partitions, or other structure limiting access to the platform 12 from its sides 22 and 24. The platform 12 serves as or defines a vehicle maintenance area, upon which a motor vehicle or the like may be removably positioned for maintenance and repair thereof.

Figure 5:
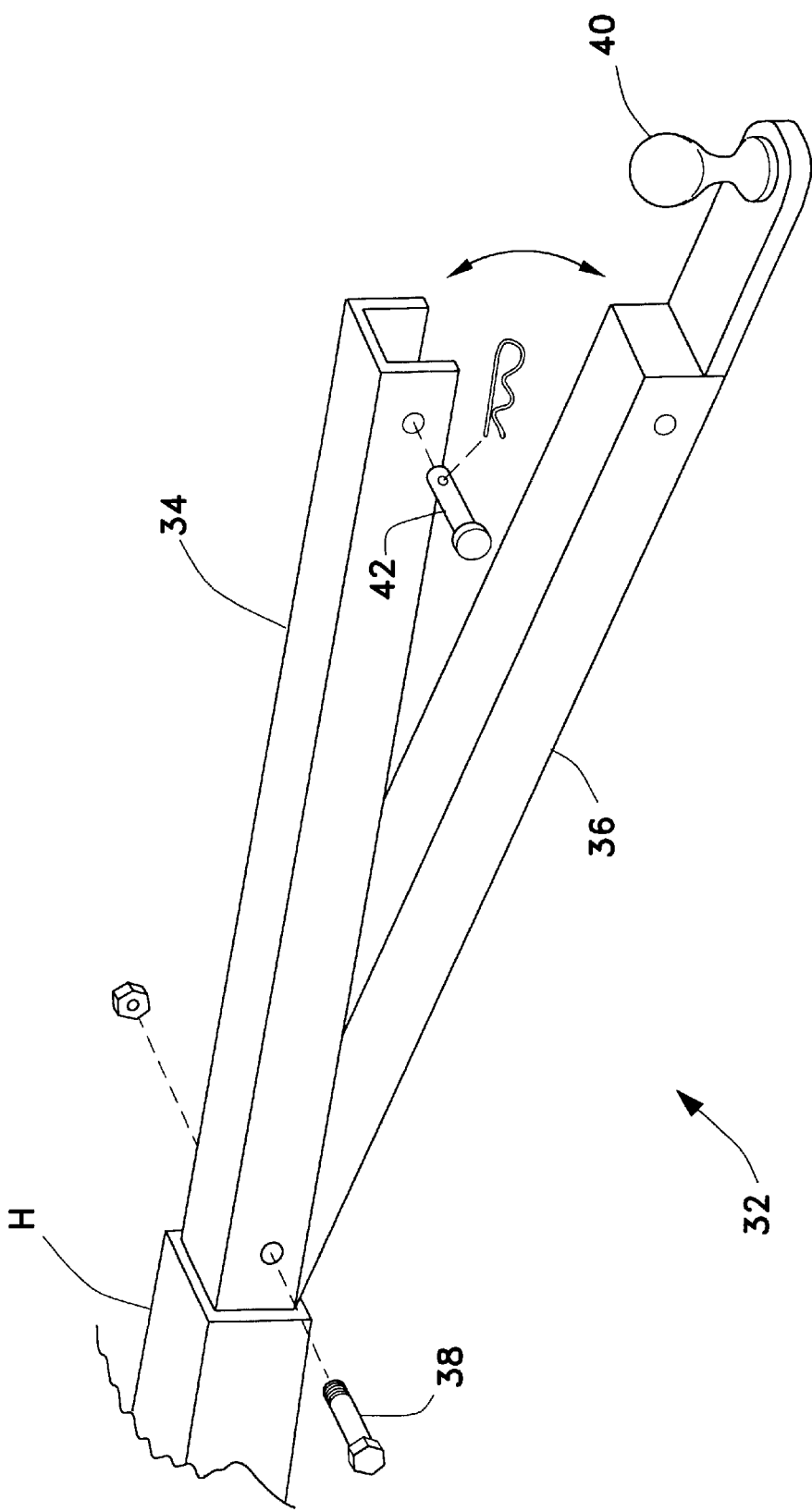
FIG. 5 is a detailed perspective view of the vertically adjustable tow hitch extending from the towing vehicle, allowing the present vehicle mobile service trailer body to be lowered to the underlying surface without unhitching from the towing vehicle.

The forward end 18 of the platform or vehicle maintenance area 12 includes a hitch assembly extending forwardly therefrom. The hitch assembly comprises a tongue structure 26 extending forwardly from the forward end 18 of the platform 12, or more properly, from its subframe 14. The tongue structure 26 includes a first hitch connection means extending forwardly therefrom, with a second hitch connection means extending rearwardly from a conventional towing vehicle; the second hitch connection means is illustrated in FIG. 5 of the drawings and discussed in detail further below. The first hitch connection means may extend directly from the tongue structure 26, as in the hitch ball receptacle 28, or may comprise a "gooseneck" type structure 30, shown in broken lines in FIG. 1.

Figure 2:
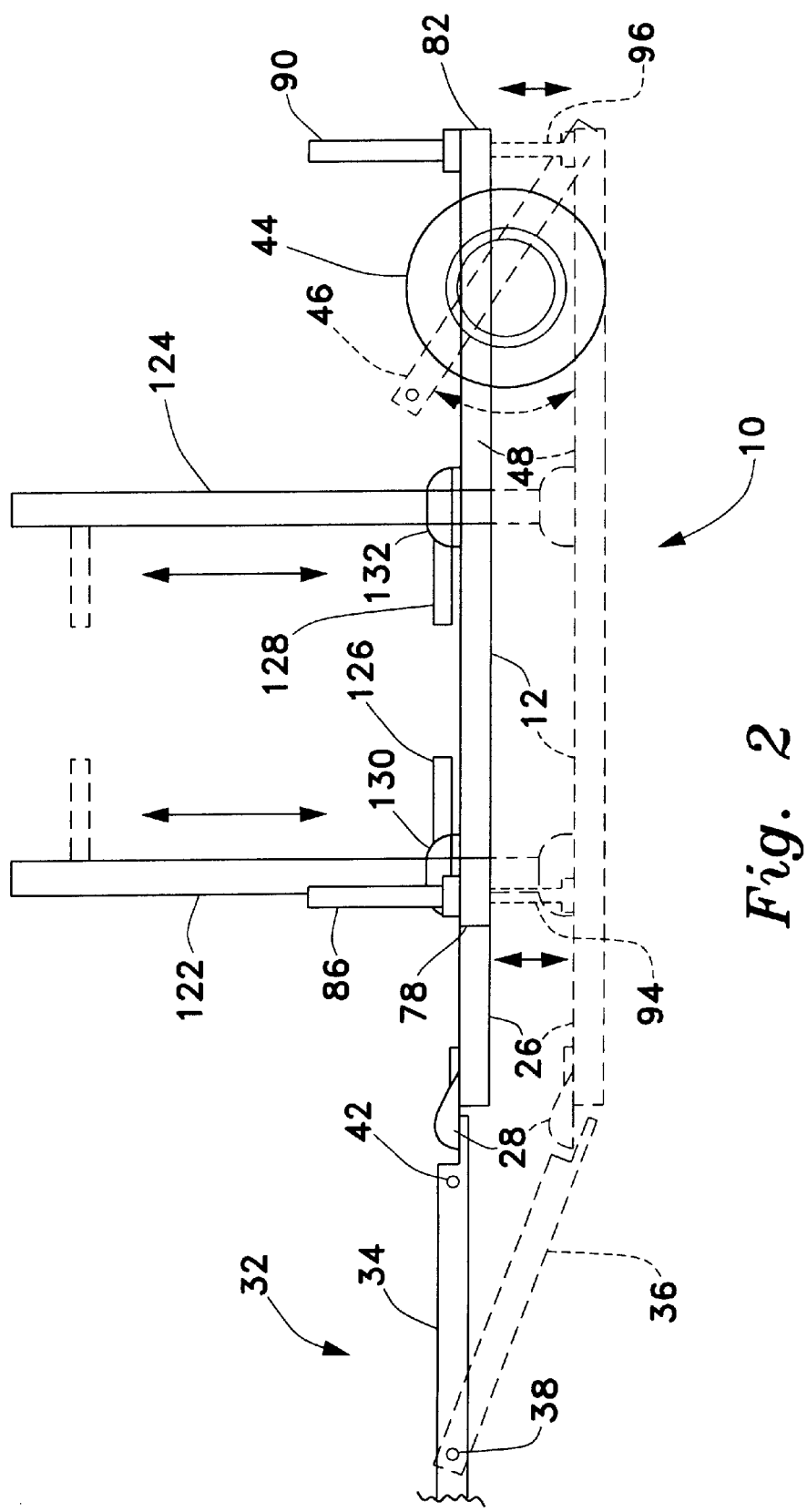
FIG. 2 is a schematic side elevation view of the present trailer, showing the lifting and lowering of the trailer body and operation of the vehicle hoists.

FIGS. 2 and 5 show the remaining portion of the hitch structure, comprising second hitch connection means 32 extending rearwardly from the hitch attachment H (receiver hitch, etc.) of a conventional towing vehicle (not shown). The second hitch connection means comprises a rigid tow bar 34 which may be permanently or removably secured to the tow vehicle, but which is immovably attached to the tow vehicle. The rigid bar 34 is formed of an inverted, generally U-shaped section of channel, thus providing an open channel accessible from beneath the bar 34. An arcuately movable tow bar 36 is pivotally secured within the channel of the rigid bar 34, by means of a pivot pin or bolt 38 passing through both bars 34 and 36 at the forward end of the pivotally mounted bar 36. The opposite rearward end of the pivoting bar 36 includes the second hitch connection means 40 (e.g., hitch ball, etc.) secured thereto, for removably connecting to the first hitch connection means 28, and a locking pin 42 for locking the two bars 34 and 36 concentrically with one another for towing operations. The specific type of hitch connection means (hitch ball receptacle 28 and hitch ball 40, pintle hitch, etc.) is not critical, so long as both the first and second hitch connection means 28 and 40 are compatible with one another.

The arcuately movable hitch bar 36 may be dropped downwardly to allow the front end of the trailer 10 to rest on the underlying surface, by removing the locking pin 42. This allows the forward end of the trailer 10 to be lowered without disconnecting the two hitch connection means 28 and 40 from one another.

Lowering the rearward portion of the trailer 10, as described below and shown in FIGS. 1 and 2, along with the forward end, allows the trailer platform 12 to rest directly upon the underlying surface, thus facilitating the placement or removal of a vehicle on or from the trailer 10. The rearward portion of the trailer 10 is shown in FIGS. 1 and 2 and partially in FIG. 3, and includes a pair of road wheels 44, with the road wheels 44 and their suspension being mounted in an arcuately pivotable road wheel support frame 46. The pivotable wheel support frame 46 is in turn mounted in a wheel carriage frame 48, which extends rearwardly from the rearward end 20 of the platform 12. The carriage frame 48 comprises a left and a right longitudinal arm, respectively 50 and 52, with a rear crossmember 54 extending between the two arms 50 and 52. The rear crossmember 54 includes lugs or ears 56 extending forwardly therefrom, to which the wheel support frame assembly 46 is pivotally secured between the left and right longitudinal arms 50 and 52 and the rear crossmember 54 and rearward end 20 of the platform 12.

No means is provided for directly lifting or lowering the wheel support frame 46, for raising or lowering the trailer 10. Rather, the trailer 10 is raised or lowered by means of hydraulic jacks at each corner thereof, as discussed further below. However, locking means is provided for locking and holding the wheel support frame 46 relative to the trailer 10, for holding the rear end of the trailer 10 off the underlying surface when the rear portion of the trailer 10 is not being supported by the rearward jacks.

Figure 3:
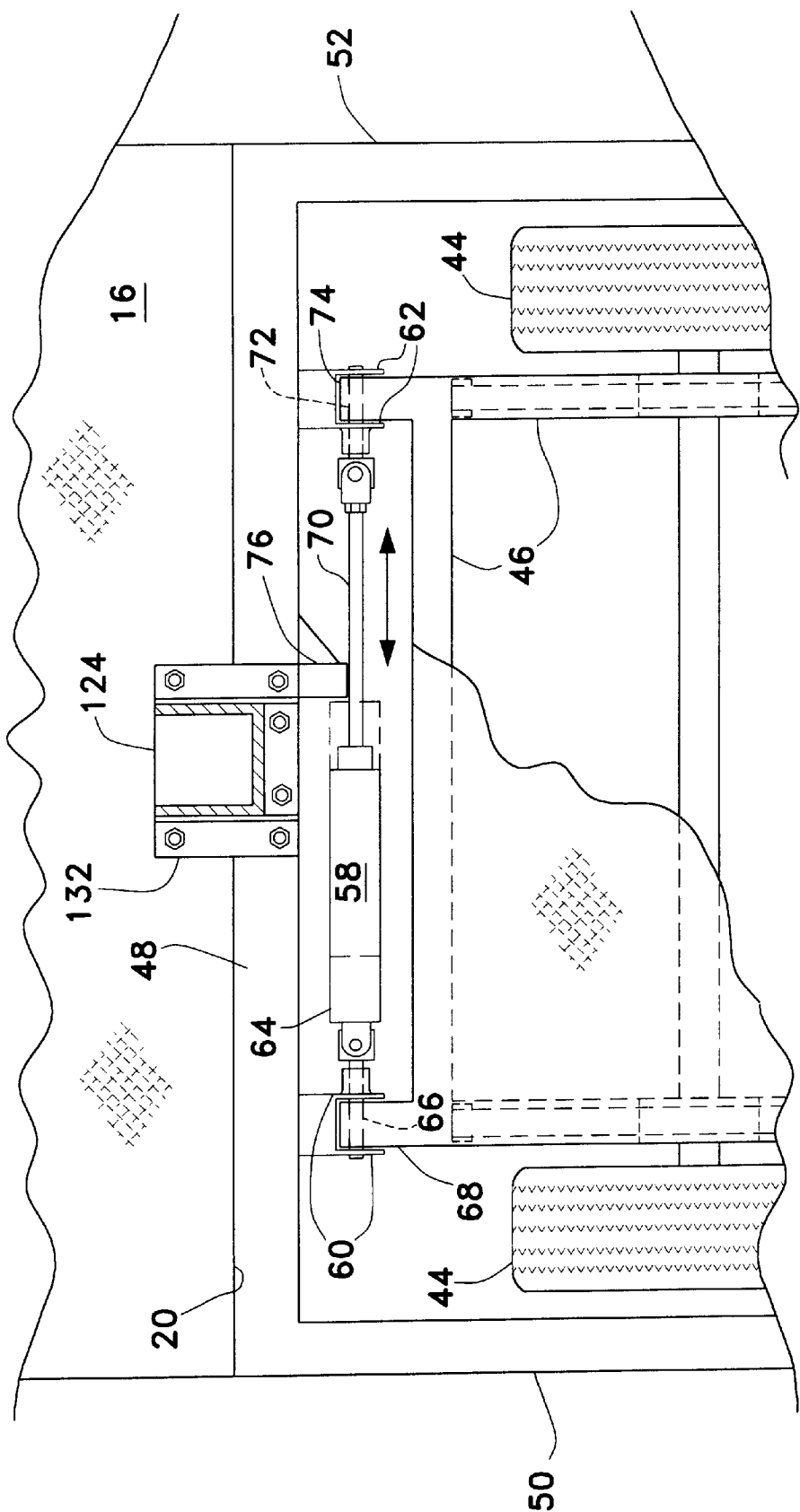
FIG. 3 is a broken away detailed plan view of the rearward portion of the present trailer, showing the hydraulically actuated locking means for the rear wheel and axle assembly.

FIG. 3 provides a detailed plan view of the means providing for locking the wheel support frame 46 relative to the wheel carriage frame 48 and the remainder of the trailer 10. A double acting hydraulic cylinder 58 is disposed laterally across the front crossmember of the wheel carriage frame 48, and communicates with opposed lugs or ears 60 and 62 extending rearwardly from the front member of the frame 48. The closed end 64 of the cylinder 58 connects to a first pin 66, which passes through the first pair of ears 60 and through a first forward extension 68 of the wheel support frame 46. The opposite ram or piston 70 of the hydraulic cylinder 58 connects to a pin 72, which passes through the second pair of ears 62 and through the second forward extension 74 of the support frame 46. The cylinder 58 is free to "float" laterally to a certain extent, with a stop 76 extending rearwardly from the forward crossmember of the wheel carriage frame 48 to limit lateral movement of the cylinder and prevent the first or left pin 66 from pulling completely from its associated lugs or ears 60.

When it is desired to lower the trailer platform 12 to the underlying surface, the corner jacks (discussed below) are lowered to lift the trailer 10 slightly and remove substantially all weight from the rearwardly disposed wheels 44 (and the hitch 28). The wheel support frame hydraulic cylinder 58 is then actuated to withdraw the two pins 66 and 72 from their respective forward wheel support frame extensions 68 and 74 (and the lock pin 42 is withdrawn from the tow bar arms 34 and 36, as shown in FIG. 5). The corner jacks are then retracted, allowing the trailer platform 12 to settle to the underlying surface, as shown in broken lines in FIG. 2. The process is reversed for readying the trailer 10 for towing, by once again extending the corner jacks to raise the trailer platform 12, thus allowing the wheel support frame 46 to settle into position with the frame extensions 68 and 74 aligned with their respective lug or ear pairs 60 and 62. (The arcuately movable tow bar 36 will be seen to be raised into concentric position within the overlying rigidly mounted tow bar 34, as well.) At this point, the hydraulic cylinder 58 is actuated to drive the pins 66 and 72 through their respective extensions 68 and 74, and lug or ear pairs 60 and 62, to lock the wheel support assembly 46 in a generally horizontal position for towing, with the road wheels 44 positioned below the trailer platform 12. (The locking pin 42 is also inserted through the common lateral passages through the two tow bars 34 and 36, as shown in FIG. 5 of the drawings.) The corner jacks are then retracted, and the trailer 10 is ready for towing.

FIGS. 1 and 2 provide a somewhat schematic and general view of the four corner jacks provided for lifting and lowering the trailer platform 12 of the present invention. The left and right platform sides 22 and 24 and their attachments to the forward platform end 18, respectively define the left and right front corners 78 and 80 of the trailer 10. The rearwardly disposed left and right longitudinal arms 50 and 52 of the wheel carriage frame 48, and the rear crossmember 54 extending therebetween, respectively define the left and right rear corners 82 and 84.

Each of these corners 78 through 84 has a corner jack positioned thereat, respectively left and right forward corner jacks 86 and 88, and left and right rear corner jacks 90 and 92. Each of these corner jacks is preferably hydraulically actuated, with the jacks 86 through 92 being hydraulically lowered to support the weight of the trailer platform 12 and relieve the weight on the rear wheels 44 and hitch 28 at initial setup for lowering the platform 12, and for raising the platform 12 when work is completed at a given maintenance location for towing the trailer 10 from that location. The four corner jacks 86 through 92 each have a conventional piston or ram (left forward and rearward rams 94 and 96 being shown in broken lines in their extended positions in FIG. 2), which drives downwardly through a conventional clearance passage (not shown) at each corner 78 through 84 of the trailer 10.

As noted further above, the present vehicle mobile service trailer includes means for loading and unloading a vehicle laterally thereon. The platform 12 is lowered to rest upon the underlying surface, but the thickness of the platform, and its relatively narrow width in comparison to the length of a conventional vehicle placed thereacross, require additional loading, unloading, and support means for the vehicle. The present trailer accordingly includes a pair of left side vehicle loading and unloading ramps, respectively 98 and 100, which extend from the left side 22 of the platform 12, and an opposite pair of right side vehicle loading and unloading ramps, respectively 102 and 104, which extend from the right side 24 of the platform 12.

Figure 4:
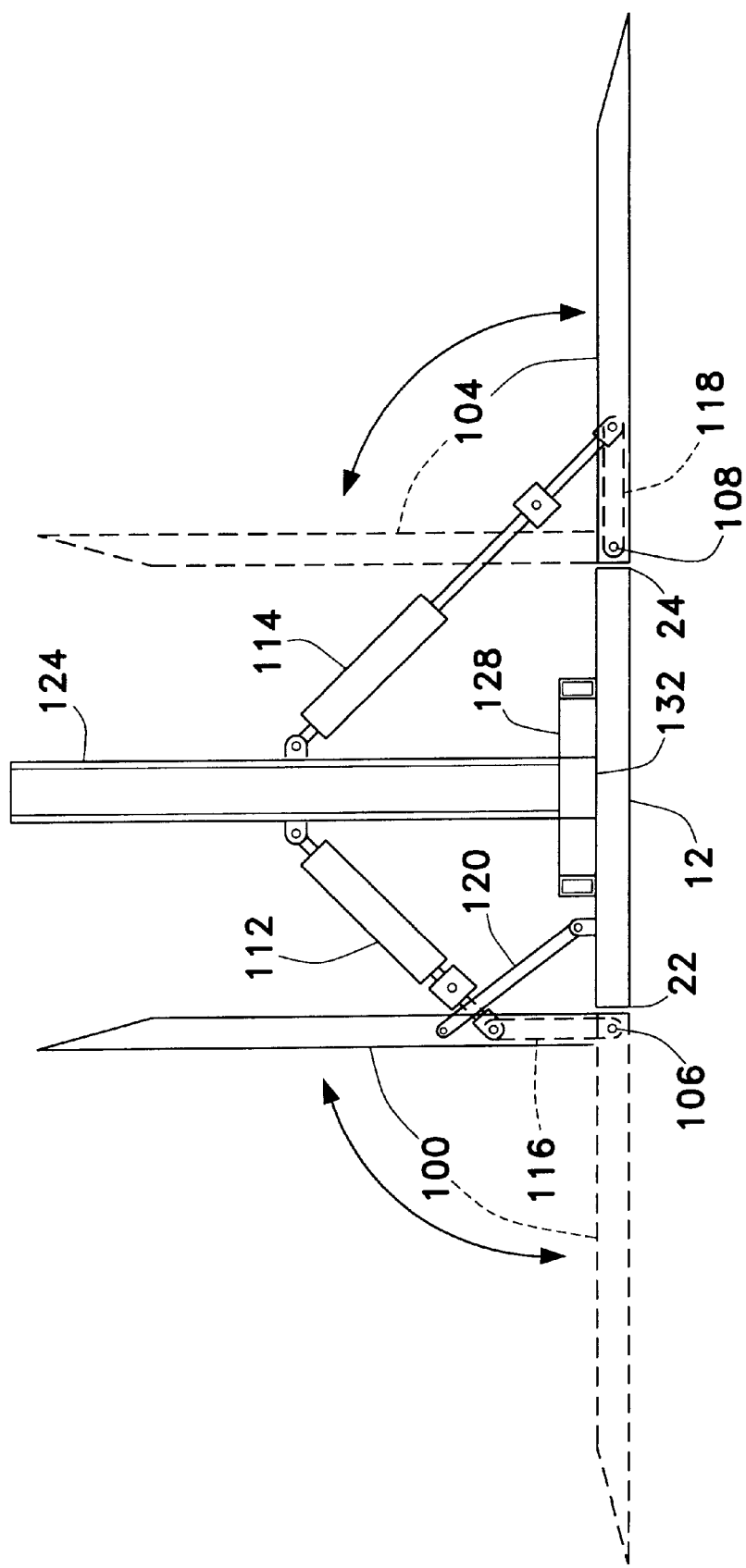
FIG. 4 is a schematic rear elevation view showing the operation of the hydraulically actuated ramps which may be extended to each side of the trailer.

All of the ramps 98 through 104 are retractable by means of hydraulic mechanisms, as indicated in FIGS. 1 and 4 of the drawings. Each ramp of each pair is connected by a common torque member (rod or tube), respectively 106 and 108, which link each ramp of each respective pair together. The torque arms 106 and 108 are in turn secured to the left and right sides 22 and 24 of the platform 12 by a series of lugs or ears 110 (one set of which is shown along the left side 22 of the platform 12 in FIG. 1), through which the torque arms 106 and 108 pass and rotate or pivot therein. The torque members or arms 106 and 108 provide sufficient flexibility along their intermediate lengths to allow their two respective ramps on each side to twist arcuately about their respective torque arms to a certain degree, thus automatically compensating for any slight unevenness of the underlying surface.

Left and right side ramp actuating cylinders, respectively 112 and 114, connect to respective left and right arms 116 and 118 which in turn extend radially from the ends of the two torque arms or members 106 and 108. These two cylinders 112 and 114 are preferably hydraulically actuated, as in the case of all of the other powered devices of the present trailer 10. The cylinders 112 and 114 are actuated to raise the ramps 98 through 104 to provide a relatively narrow width for the trailer 100 for transport, and are extended to allow the ramps 98 through 104 to lower to the underlying surface for placement of a vehicle across the trailer 10. Retaining links 120, one of which is shown in FIG. 4, may be provided to lock the ramps 98 through 104 in their raised positions.

Once a vehicle has been loaded across the present vehicle service trailer 10, some means must be provided for raising or lifting the vehicle for access to the underside thereof. Accordingly, the present trailer 10 includes first and second vehicle lifts or hoists, respectively 122 and 124, located respectively at the forward and rearward ends 18 and 20 of the platform 12. The two lifts or hoists 122 and 124 are generally conventional, preferably being hydraulically actuated by means of hydraulic motors powering chains which travel within their respective hoist columns to raise and lower their respective chassis lift arms 126 and 128. Hoists 122 and 124 of this type may be secured directly to the underlying surface (e. g., the trailer platform 12), and do not require any space below their respective mounting bases 130 and 132.

In summary, the present vehicle mobile service trailer 10 is easily towed to the location of a vehicle needing service, and positioned laterally to the front or rear of the vehicle. This lateral placement greatly facilitates positioning the trailer 10 in a crowded parking area with relatively narrow lanes, as the towing vehicle does not require room directly to the front or rear of the vehicle requiring service, for positioning the trailer (and of course its towing vehicle) longitudinally relative to the vehicle requiring maintenance. Only sufficient room is required to the front or rear of the vehicle requiring service, for extending the ramps 98 through 104 to the sides of the trailer platform 12.

Once the trailer 10 has been positioned as desired, the corner jacks 86 through 92 are extended to relieve the weight of the trailer 10 upon its rearwardly disposed wheels 44 and the forwardly disposed hitch 28. The hitch lock pin 42 is removed from the two hitch arms 34 and 36, allowing the movable tow bar arm 36 to lower from its position within the upper fixed arm 34 when the trailer platform 12 is lowered, without need to disconnect the hitch means 28 of the trailer 10 from the hitch means 40 of the towing vehicle. The hydraulic cylinder 58 is also retracted at this time to release the locks for the wheel support frame 46. Once the movable hitch bar 36 and wheel support frame 46 have been unlocked, the four corner jacks 86 through 92 are retracted, thereby allowing the trailer platform 12 to settle to the underlying surface.

Once the trailer platform 12 is resting upon the underlying surface, the ramps 98 through 104 are released from their retaining links 120 and lowered, using the left and right side ramp actuating cylinders 112 and 114; these cylinders 112 and 114 have their upper ends secured to the rearward lift hoist 124, as shown in FIGS. 1 and 4 of the drawings. The vehicle requiring maintenance is then positioned across the lowered trailer platform 12 with its wheels resting upon the ramps 98 through 104, the chassis lift arms 126 and 128 positioned beneath the vehicle, and the lift hoists 122 and 124 actuated to raise the vehicle in the air above the trailer platform 12 for access to the underside of the vehicle. All of the various hydraulic devices are powered by a hydraulic power pack 134, installed on the tongue structure 26 or elsewhere as desired.

The vehicle may be lowered and raised repeatedly as required during maintenance operations by means of the two lift hoists 122 and 124, as in a conventional fixed maintenance shop or the like. Once the required or desired maintenance has been accomplished on the vehicle, the vehicle is lowered to rest upon the ramps 98 through 104 and the two chassis lift or support arm assemblies 126 and 128 are withdrawn from their positions beneath the vehicle. The vehicle may then be driven or otherwise removed from its position on the ramps 98 through 104 and across the trailer 10, back to its original position or other location as desired.

Once the vehicle is clear of the trailer 10, the four ramps 98 through 104 are folded and secured by means of their respective retaining links, to reduce the width of the trailer 10 for towing. The four corner jacks 86 through 92 are then lowered to raise the trailer platform 12 to its normal towing height, thereby aligning the two hitch bars 34 and 36 and the wheel support frame 46 within its wheel carriage frame 48. The hitch lock pin 42 is reinstalled through the two hitch tow bars 34 and 36, and the wheel assembly lock cylinder 58 is actuated to extend the ram 70, driving the retaining pins 66 and 72 through their respective fittings 60, 68 and 62, 74 to lock the wheel support frame 46 and its road wheels 44 in position for towing. The corner jacks 86 through 92 are then retracted, readying the trailer 10 for towing to another site for further vehicle maintenance operations. All of the hydraulic mechanisms of the present trailer 10 may receive their power from the onboard hydraulic power pack 134, noted further above.

The above described vehicle mobile service trailer 10 will thus be seen to provide a most useful and efficient means of providing maintenance service for cars, light trucks, and other related vehicles which cannot be driven or transported to a fixed maintenance facility for whatever reason. The present trailer 10 provides a much needed means for a mechanic to provide the means in the field for lifting a vehicle for access to the underside thereof, without requiring that the vehicle be driven or towed to a shop at some other remote location. The present vehicle mobile service trailer also provides other advantages with its lateral loading for use in a restricted area, thus enabling the mechanic to perform work upon a vehicle where it was previously extremely difficult, or perhaps impossible, to access the vehicle for such work. Thus, the present vehicle mobile service trailer will prove to be a most popular tool for mechanics and others who may have need to provide service to vehicles in remote locations, away from the facilities of a fixed maintenance shop.

It is to be understood that the present invention is not limited to the sole embodiment described above, but encompasses any and all embodiments within the scope of the following claims.

I claim:

1. A vehicle mobile service trailer for towing behind a towing vehicle to a desired site and for accessing and servicing the underside of a vehicle placed thereon, comprising:

a low, generally flat platform having a forward end, a rearward end, and a left and a right side;

said platform further including a laterally open and unbroken vehicle maintenance area extending between said forward end and said rearward end thereof, for removably placing a vehicle thereon for maintenance of the vehicle;

road wheels extending rearwardly from said rearward end of said platform;

hitch means extending forwardly from said forward end of said platform;

means for laterally loading and unloading the vehicle from said left and said right side of said platform, and for placing the vehicle laterally across said platform for maintenance of the vehicle; and vehicle lift means for raising the vehicle for maintenance access to the underside thereof.

2. The vehicle mobile service trailer according to claim 1, wherein said vehicle lift means comprises:

a first hydraulically actuated chain hoist disposed at said forward end of said platform; and a second hydraulically actuated chain hoist disposed at said rearward end of said platform.

3. The vehicle mobile service trailer according to claim 1, with said platform including:

left and right forward corners;

a wheel carriage frame extending from said rearward end of said platform;

said wheel carriage frame defining left and right rearward corners; and each of said corners including a corner jack for raising and lowering said platform.

4. The vehicle mobile service trailer according to claim 3, wherein each said corner jack is hydraulically actuated.

5. The vehicle mobile service trailer according to claim 1, wherein said road wheels are pivotally attached to said platform for selectively raising and lowering said platform to the underlying surface as desired.

6. The vehicle mobile service trailer according to claim 5, with said platform including:

a wheel carriage frame extending from said rearward end of said platform;

said wheel carriage frame including left and right longitudinal arms and a rearwardly disposed crossmember extending therebetween;

a road wheel support frame carrying said road wheels and extending forwardly from said rearward crossmember of said wheel carriage frame;

said road wheel support frame being pivotally mounted to said rearward crossmember and disposed between said left and right longitudinal arms of said wheel carriage frame and between said rearward crossmember and said rearward end of said platform; and locking means disposed upon said rearward end of said platform and communicating with said road wheel support frame, for selectively locking said road wheel support frame with said road wheels lowered for towing and transport.

7. The vehicle mobile service trailer according to claim 1, wherein said hitch means folds for selectively raising and lowering said forward end of said platform without disconnecting said hitch means from said platform or from the towing vehicle.

8. The vehicle mobile service trailer according to claim 7, wherein said hitch means comprises:

a tongue structure extending forwardly from said platform;

said tongue structure having a forward end;

first hitch connection means extending from said forward end of said tongue structure;

a rigid tow bar extending rearwardly from the towing vehicle;

said rigid tow bar having an open bottom with an arcuately movable tow bar installed therein;

said arcuately movable tow bar having a forward end pivotally installed in said rigid tow bar, and a rearward end having second hitch connection means disposed thereon; and said first hitch connection means being removably connected to said second hitch connection means of said arcuately movable tow bar, for selectively raising and lowering said platform without disconnecting said first and said second hitch connection means from one another.

9. The vehicle mobile service trailer according to claim 1, including:

a left side pair of vehicle loading and unloading ramps retractably extending from said left side of said platform, and;

a right side pair of vehicle loading and unloading ramps retractably extending from said right side of said platform.

10. The vehicle mobile service trailer according to claim 9, wherein:

said ramps of said left side pair are connected by a common left side torque member, and said ramps of said right side pair are connected by a common right side torque member;

each said torque member being pivotally attached respectively to said left side and to said right side of said platform; and each said torque member communicating respectively with a left side and a right side actuating member for selectively raising and lowering said ramps as desired.

11. A vehicle mobile service trailer for accessing and servicing the underside of a vehicle placed thereon, comprising:

a low, generally flat platform having a forward end, a rearward end, and a left and a right side;

said platform further having a laterally open and unbroken vehicle maintenance area extending between said forward end and said rearward end thereof, for removably placing a vehicle thereon for maintenance of the vehicle;

means for laterally loading and unloading the vehicle from said left and said right side of said platform, and for placing the vehicle laterally across said platform for maintenance of the vehicle; and a first vehicle lift means disposed at said forward end of said platform and a second vehicle lift means disposed at said rearward end of said platform, for raising the vehicle for maintenance access to the underside thereof.

12. The vehicle mobile service trailer according to claim 11, wherein said first and said vehicle lift means each comprise a hydraulically actuated chain hoist.

13. The vehicle mobile service trailer according to claim 11, with said platform including:

left and right forward corners;

a wheel carriage frame extending from said rearward end of said platform;

said wheel carriage frame defining left and right rearward corners; and each of said corners including a corner jack for raising and lowering said platform.

14. The vehicle mobile service trailer according to claim 13, wherein each said corner jack is hydraulically actuated.

15. The vehicle mobile service trailer according to claim 11, including road wheels pivotally attached to said platform for selectively raising and lowering said platform to the underlying surface as desired.

16. The vehicle mobile service trailer according to claim 15, with said platform including:

a wheel carriage frame extending from said rearward end of said platform;

said wheel carriage frame including left and right longitudinal arms and a rearwardly disposed crossmember extending therebetween;

a road wheel support frame carrying said road wheels and extending forwardly from said rearward crossmember of said wheel carriage frame;

said road wheel support frame being pivotally mounted to said rearward crossmember and disposed between said left and right longitudinal arms of said wheel carriage frame and between said rearward crossmember and said rearward end of said platform; and locking means disposed upon said rearward end of said platform and communicating with said road wheel support frame, for selectively locking said road wheel support frame with said road wheels lowered for towing and transport.

17. The vehicle mobile service trailer according to claim 11, including folding hitch means for selectively raising and lowering said forward end of said platform without disconnecting said hitch means from said platform or from the towing vehicle.

18. The vehicle mobile service trailer according to claim 17, wherein said hitch means comprises:

a tongue structure extending forwardly from said platform;

said tongue structure having a forward end;

first hitch connection means extending from said forward end of said tongue structure;

a rigid tow bar extending rearwardly from the towing vehicle;

said rigid tow bar having an open bottom with an arcuately movable tow bar installed therein;

said arcuately movable tow bar having a forward end pivotally installed in said rigid tow bar, and a rearward end having second hitch connection means disposed thereon; and said first hitch connection means being removably connected to said second hitch connection means of said arcuately movable tow bar, for selectively raising and lowering said platform without disconnecting said first and said second hitch connection means from one another.

19. The vehicle mobile service trailer according to claim 11, including:

a left side pair of vehicle loading and unloading ramps retractably extending from said left side of said platform, and;

a right side pair of vehicle loading and unloading ramps retractably extending from said right side of said platform.

20. The vehicle mobile service trailer according to claim 19, wherein:

said ramps of said left side pair are connected by a common left side torque member, and said ramps of said right side pair are connected by a common right side torque member;

each said torque member being pivotally attached respectively to said left side and to said right side of said platform; and each said torque member communicating respectively with a left side and a right side actuating member for selectively raising and lowering said ramps as desired.

* * * * *